INVENTOR.
HERBERT J. VENABLES, III
BY
McNENNY, FARRINGTON, PEARNE & GORDON
ATTORNEYS

INVENTOR.
HERBERT J. VENABLES, III
BY
McNENNY, FARRINGTON, PEARNE & GORDON

ATTORNEYS

United States Patent Office 3,619,883
Patented Nov. 16, 1971

3,619,883
DIE ASSEMBLER
Herbert J. Venables III, Cleveland, Ohio, assignor to The Venables Machine and Tool Company, Cleveland, Ohio
Filed June 9, 1969, Ser. No. 831,525
Int. Cl. B23p 19/00
U.S. Cl. 29—200 R                            6 Claims

ABSTRACT OF THE DISCLOSURE

An apparatus to facilitate the assembly of die sets including a vertically movable carriage to which a die holder may be provisionally mounted and a support shaft to which an opposite die holder may be correspondingly mounted. The shaft is horizontally offset from the carriage area to support its associated die holder assembly either directly above the other die holder assembly for fitting or in a horizontally displaced position to permit access to the inner surfaces of both assemblies.

BACKGROUND OF THE INVENTION

This invention relates to an apparatus for facilitating the assembly of punch and die sets. More particularly, the invention considers a die assembler which permits a punch and die set to be accurately and conveniently fitted on a pair of die holders which are provisionally secured to the assembler.

The die assembler accurately positions upper and lower die holders while a punch and die set is fitted and secured to these holders. The locating and machining operations required to properly assemble and secure the punch and die set to the holders are readily made with this invention. The device allows the upper and lower members to be separated for inspection and machining operations during the various steps of die assembly. The apparatus insures that the members will be in exact alignment when they are re-engaged during each stage of the assembly and, ultimately, when they are used.

PRIOR ART

Generally, in the past, die handlers have been provided with upper and lower platens to which die holder sets could be mounted. Assembly procedures required by prior equipment have been imperfect. This has resulted from designs which have ignored the important aspect of accessibility for machine tools in die assembly. Since, normally, punch and die members are bolted in successive assembly stages to the die holders during their assembly, it is highly desirable to provide as much accessibility as possible for drilling, tapping, and other machining of the die and holder assemblies. Commonly, in the past die handlers have not provided full accessibility to both die holders. In many cases, an upper platen and die holder assembly would obstruct the lower die holder assembly, thereby preventing necessary machining of the lower assembly. In many cases this require that at least one of the die and holder assemblies be removed from the apparatus in order to perform work on it and/or the remaining assembly.

SUMMARY

The die assembler apparatus of this invention provides a substantial improvement over previous equipment in the area of die assembly. Besides its versatility, this device provides a high degree of accessibility to the important work surfaces of the dies and holders. Labor is saved and accuracy of assembly is improved with the use of this invention.

Since all of the important work surfaces may be reached for fitting, machining, and assembling, it is no longer necessary to remove die and holder assemblies from the apparatus. Previously, when it was necessary to dismount a die and holder assembly to perform work on it, it was also necessary that the assembly be carried to another working area, be properly positioned, and be safely clamped for machining operations. When this remote machining was completed, the assembly usually was returned to the assembly station and remounted to the die assembly device for further fitting and assembly work. The present invention substantially reduces overall assembly time by eliminating the need for these extra non-productive steps. Safety hazards are minimized by permitting the assemblies to be continuously clamped throughout the assembly stages. Further, it was not always possible to remount the assembly in its exact original location and any variations in its placement would, of course, reduce the accuracy of the entire assembly. The present invention eliminates this source of error since the assemblies need not be removed from the assembler until they are substantially complete.

The compact arrangement of the die assembler of this invention, besides using a minimum of floor space, also permits it to be conveniently used with a single drill press. The device is arranged to support the work in a relatively small zone in order that all of the working surfaces will be within the swing of a drill press. At the same time, the arrangement of the device permits an operator to conveniently reach the controls of a drill press regardless of the particular position of a die and holder assembly.

DESCRIPTION OF THE PREFERRED EMBODIMENT

Figure 1:
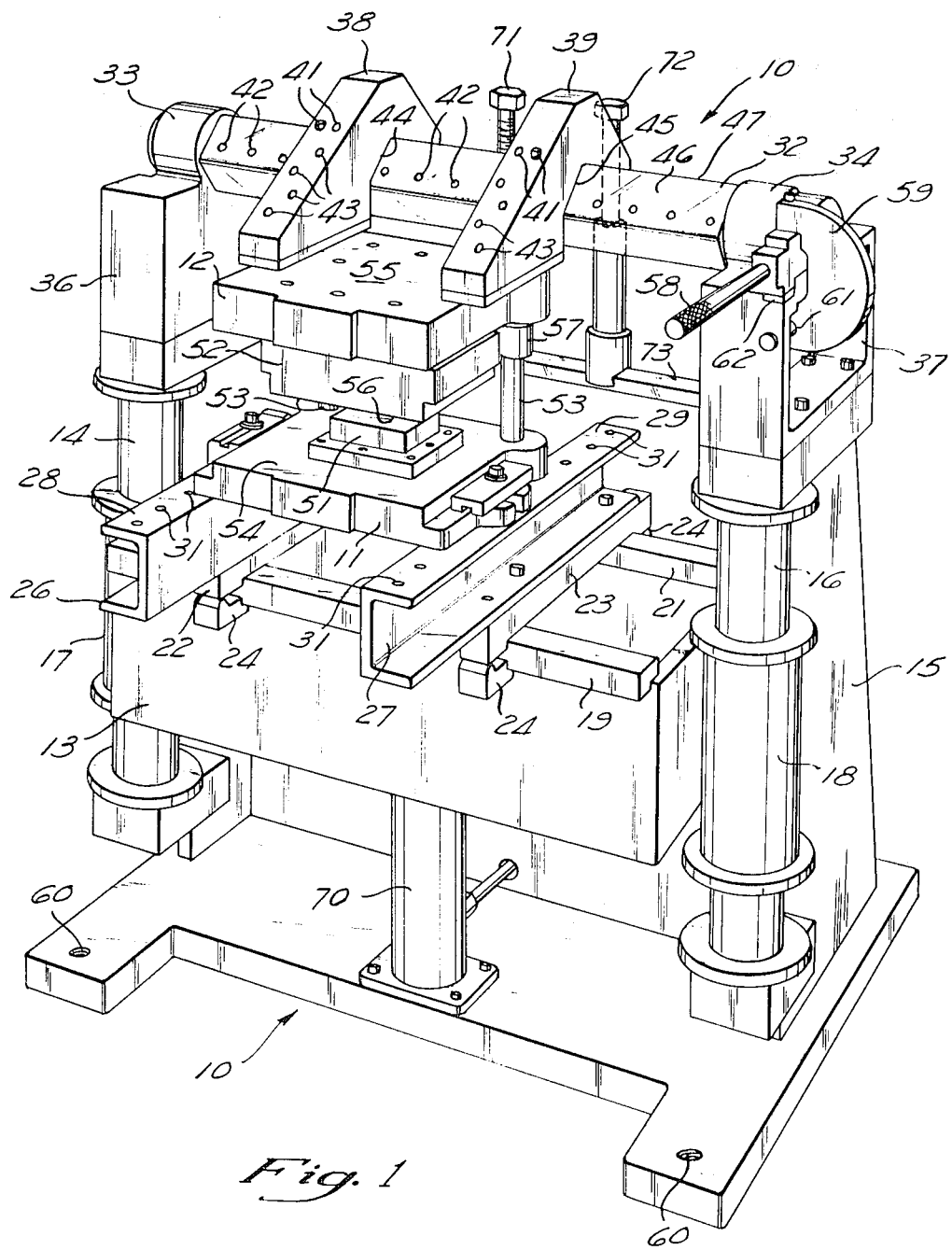
FIG. 1 is a perspective view showing a die assembler constructed in accordance with this invention.

Referring now to the drawings, a device 10 for assembling punch and die sets is shown supporting a lower die holder 11 and an upper die holder 12. A carriage 13 supports the lower die holder 11 for vertical positioning. The carriage 13 is guided by a pair of parallel vertical guide posts 14 and 16 which are mounted in a frame structure 15 of the die assembler 10. The carriage 13 comprises a rectangular box section having a pair of guide bushings 17 and 18 secured to each of its ends which slide along the guide posts 14 and 16.

Front and rear clamping rails 19 and 21, respectively, are secured to the upper side of the carriage assembly 13. A pair of clamping bars 22 and 23 are clamped to the clamping rails 19 and 21 by cooperating clamps 24. A pair of supporting channels 26 and 27 are secured to the clamping bars 22 and 23 and provide a pair of supporting surfaces 28 and 29, respectively, which support the lower die holder 11. As seen in FIG. 1, both of the support channels 26 and 27 may be moved laterally along the clamping rails 19 and 21 and secured in any desired position. The mating surfaces of the clamping rails, clamping bars, and support channels are ground to insure that the upper surfaces 28 and 29 of the support channels will be coplanar with each other and perpendicular to the guide posts 14 and 16. A series of tapped holes 31, perpendicular to the clamping rails 19 and 21, is provided on the upper sides of the support channels 26 and 27 to provide for forward and rearward adjustment and securing of the lower die holder 11.

The upper die holder 12 is supported by a rotatable shaft or prism bar 32. The supporting bar 32 is mounted horizontally in a pair of trunnions 33 and 34 which are secured to a pair of subframes 36 and 37. The lower surfaces of the subframes 36 and 37 and mating upper surfaces of the frame 15 are ground to assure that the axis of the prism bar 32 will be perpendicular to the guide posts 14 and 16.

A pair of support brackets 38 and 39 are provided to support the upper die holder 12. The brackets 38 and 39 are provided with a pair of notches 44 and 45 to conform with two sides 46 and 47 of the prism bar 32. The support brackets 38 and 39 may be moved laterally along the prism bar 32. Their positions are determined when they allow adequate vertical access or exposure to the area of the upper die holder 12 on which work is to be performed and either of the bolt holes 41 provided on each support bracket is aligned with a hole 42 in the prism shaft 32. The support brackets 38 and 39 may then be bolted to the prism bar 32 and the upper die holder 12 may in turn be bolted to the brackets through a set of holes 43 arranged transversely to the prism shaft 32. The surfaces of the support brackets 38 and 39 mating with the upper die holder 12 are coplaner when the brackets are secured to the prism bar 32.

A male die member 51 is shown supported by the lower die holder 11. A cooperating female die member 52 is shown supported on the upper die holder 12. The lower and upper die holders 11 and 12 are aligned to one another by a set of back guide posts 53 which permit vertical relative motion between these members. This particular arrangement and form of dies and die holders is for illustration only. Obviously, various other forms of die sets and holders may be accommodated by this invention, and their positions relative to each other may be reversed.

During assembly, typically, the steps of die assembly may first include securing the lower and upper die holders 11 and 12 to the support channels 26 and 27 and the support brackets 38 and 39, respectively. One of the die members 51 or 52 may be secured to its associated die holder 11 or 12 and the mating die member must then be correspondingly located on the opposite holder.

The proper location of the unsecured die member on its associated holder may be found, for instance, by engaging the die members and then bringing the holders together by lifting the carriage 13. The die members are normally fastened to their associated holders by bolts and the unsecured die member may be provided with a series of pre-tapped holes for this purpose. The location of these pre-tapped holes in the unsecured die member may be transferred to its associated holder by the use of transfer screws with a technique familiar to those skilled in the art. Transfer screws are provided with a pointed end and are temporarily set into the pre-tapped holes of the unsecured die member. Upon a sufficient contact load between the transfer points and the holders, the points will punch the proper hole centers on the holder surface facing the die. The mounting holes may then be drilled at the indicated locations on the die holder.

Besides the drilling operations indicated above, typical die assembly procedures which may be advantageously performed with this invention include tapping, counterboring, reaming and doweling. Operations such as these are performed to secure and accurately pin the die members to their associated holders and are familiar to those skilled in the art. Additionally, secondary machining operations may be performed on the die members such as drilling and reaming for pressure pins which will be used to eject a part formed by the die. Proper die assembly, particularly where a die member comprises a number of subelements, requires that the parts be carefully fitted and inspected many times during each stage of assembly.

Figure 2:
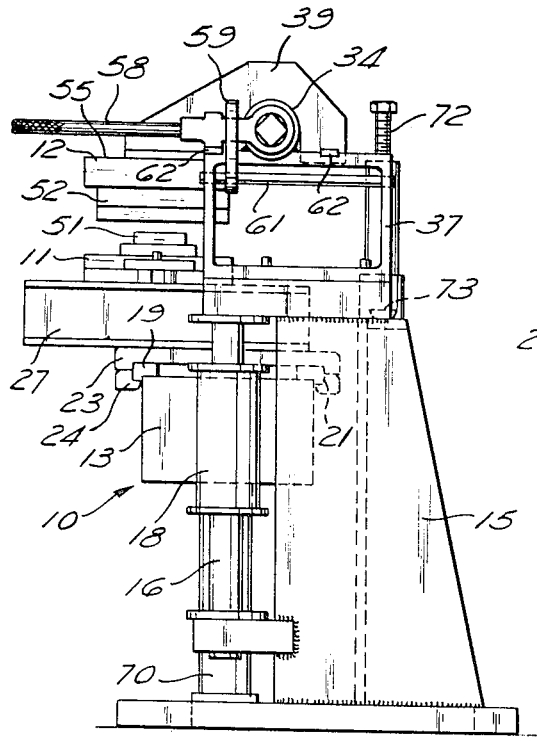
FIG. 2 is a side elevational view of the die assembler showing an upper die holder assembly in a closed position.
Figure 3:
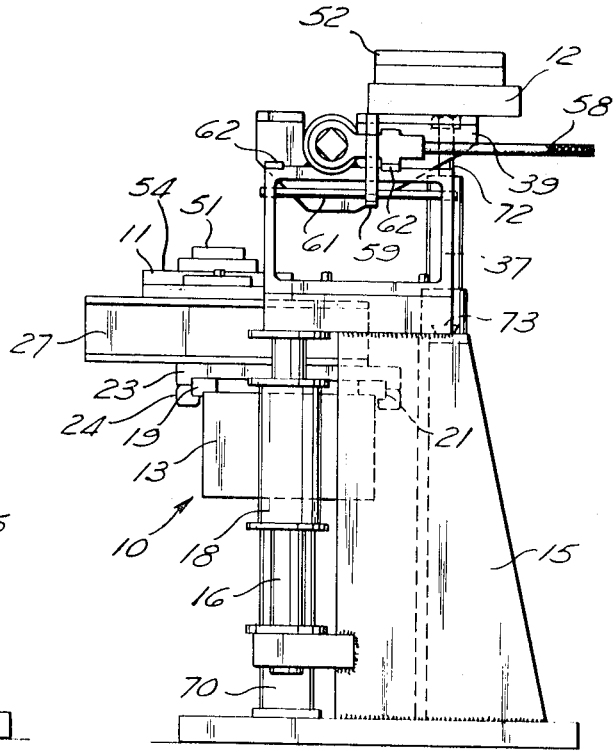
FIG. 3 is a side elevational view similar to that shown in FIG. 3 except that the upper die holder assembly is shown in an open position.
Figure 4:
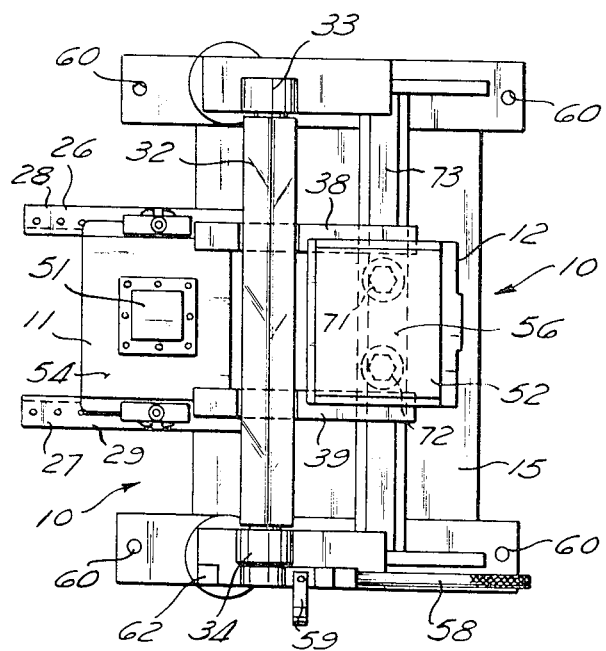
FIG. 4 is a top view of the die assembler as shown in FIG. 3.

From the foregoing, it is apparent that machine tool access to inner faces 54 and 56 of the lower and upper die holders 11 and 12 is very important. The die assembler 10 of this invention provides full accessibility to three working surfaces of the die holder assemblies. These three working surfaces comprise the outer surface 55 of the upper die holder 12, the inner face 54 of the lower holder 11 and its associated die member 51, and the inner face 56 of the upper holder 12 and its associated die member 52. FIGS. 1 and 2 show that the outer surface 55 of the upper die holder 12 is accessible for drilling and other machining operations from the area above it. FIGS. 3 and 4 show the upper die and holder assembly supported in a second or inverted open position. From these latter views, it is evident that machine tool vertical access is available for the two inner surfaces 54 and 56 of the die holders and the die members 51 and 52.

The offset design of this invention by which the upper die holder 12 is normally supported in a cantilever manner from the prism shaft 32 permits full access to the lower die holder 11 and die member 51 from the area above them. As seen in the figures, the prism shaft 32 is positioned to the rear of the center of the carriage 13 and support channels 26 and 27. The horizontal rearward offset of the prism shaft 32 with respect to the working area provided by the carriage 13 and support channels 26 and 27 makes it possible to reach the lower die holder 11 and die member 51 from the area above them. Of course, there is no obstruction above the upper die holder 12 and die member 52 when they are supported in the open position.

The arrangement provided by this invention not only provides full access to the important working surfaces but also provides that the open and closed positions of the upper die and holder assembly together take up relatively little horizontal area. The area used need only be the horizontal projections of the upper die and holder assembly and the width of the support bar 32. Thus, this cantilever support arrangement requires a minimum of floor space.

The assembler 10 may be positioned adjacent a drill press. The relatively small horizontal zone described by both positions of the upper die and holder assembly will normally be small enough to be reached by a drill press head. Moreover, if a drill press dies to one side of the assembler 10, its controls usually may be conveniently reached by an operator standing in front of the assembler when machining the upper die and holder assembly in either position. This is particularly important since it is customary to provide controls on only one side of a drill press. To level the assembler 10 with respect to a drill press, a set of tapped holes 60 and leveling screws (not shown) are provided at the corners of the frame base.

To separate the upper and lower die holders 11 and 12 from the position illustrated in FIG. 1 to the open position illustrated in FIG. 3, it is necessary to lower the carriage 13 until the back guide posts 53 are clear of their associated guide bushings 57 (only one is shown). The upper die holder assembly may then be rotated about the axis of the prism shaft 32. This is accomplished by manually rotating the handle 58 which is keyed to the shaft 32. The handle 58 and therefore the shaft 32 and its brackets 38 and 39, may be locked in either of two positions by a single clamp 59. The clamp 59 may be slid along a guide rod 61 as shown in FIGS. 2 and 3 to secure the upper shaft and bracket assembly in either of its positions. Thus, the clamp 59 resists any tool forces on the die member 52 or upper holder 12, such as the force created by withdrawal of a drill bit. A pair of hardened stop pads 62 arrest the handle 58. The individual thickness of each of these stop pads 62 is determined such that the prism shaft 32 is permitted to rotate through exactly 180° and that the surfaces of the support brackets 38 and 39 mating with the upper die holder 12 will be arrested in planes perpendicular to the carriage guide posts 14 and 16.

A double acting hydraulic cylinder and piston 70 is provided to raise or lower the carriage 13. A manual hydraulic pump (not shown) may be used to drive the hydraulic cylinder 70. A control valve (also not shown) may be used to direct the motion of the hydraulic cylinder 70 and carriage 13 and to hydraulically lock the carriage in any desired vertical position.

A pair of adjustable screw jacks 71 and 72 are provided at the rear of the die assembler to support cantilever loads on the upper die holder when it is held in the open position. The jacks 71 and 72, besides being vertically adjustable, are laterally movable on a rail 73 in order that they may be adjusted to suit a particular job. Normally, in the opposite or closed position, machining operations on the outer surface of the upper die holder 12 develop relatively light loads. These operations include, most often, the counterboring of holes to provide recesses for socket head cap screws which secure the associated die member. Usually, a die holder set will be provided with a pair of guide posts and cooperating bushings, such as those shown in the figures, which may be engaged in the closed position of the assembler 10. These guide posts 53 and bushings 57 provide additional support against machining loads otherwise supported by the cantilever support shaft 32. Thus, there is generally no requirement to provide auxiliary support jacks for the upper die holder when it is in this closed position. When unusually severe loads might be developed on the upper die holder 12 in the closed position, auxiliary jacks may be placed between it and the lower die holder 11 or the support channels 26 and 27.

No access is provided by this device for the lower side of the lower die holder 11 which represents the forth side of the die and holder assemblies. It should be note that generally the required machining operations on this lower side of the lower die holder 11 will be secondary operations such as the counter-boring of mounting holes. These operations may usually be accomplished after the die assembly is complete and when, therefore, the die holders may be finally removed from the die assembler.

Although a preferred embodiment of this invention is illustrated, it is to be understood that various modifications and rearrangements of parts may be resorted to without departing from the scope of the invention.

What is claimed is:

1. A die assembler having a lower vertically movable carriage means adapted for mounting a lower die holder thereon within a working area above said carriage, said carriage means including support members horizontally adjustable in one direction and supporting said lower die holder, said support members providing first die holder securing means along lines perpendicular to said adjustable direction, frame means including two vertical guide post means supporting said carriage means for vertical movement, fluid actuator means secured to said frame means and said carriage means to selectively raise or lower said carriage means, trunnion means provided by said frame means, shaft means on said trunnion means rotatable about a horizontal axis, stop means limiting the rotation of said shaft means to 180° between two stop positions, support bracket means secured to said shaft means and adapted for mounting an upper die holder thereon, said support bracket means being horizontally adjustable along said shaft means and providing second die holder securing means along lines perpendicular to said shaft means, said bracket means supporting said upper die holder in vertical alignment above said lower die holder when said shaft means is arrested in one of said stop positions, said shaft means being horizontally offset from said working area such that said bracket means may support said upper die holder in an inverted position horizontally displaced from said working area when said shaft is arrested in the other of its positions.

2. A die assembler having a lower vertically movable carriage means adapted for mounting a lower die holder thereon within a working area above such carriage means, frame means including vertical guide means supporting said carriage for vertical movement, actuator means secured to said frame means and said carriage means to selectively raise or lower said carriage means, trunnion means provided by said frame means, shaft means on said trunnion means rotatable about a horizontal axis, stop means limiting rotation of said shaft means to 180° between two stop positions, support bracket means secured to said shaft means and adapted for mounting an upper die holder thereon, said bracket means supporting said upper die holder in vertical alignment above said lower die holder when said shaft means is arrested in one of said stop positions, said shaft means being horizontally offset from said working area such that said bracket means may support said upper die holder in an inverted position horizontally displaced from said working area when said shaft means is arrested in the other of its positions, said carriage means including support members horizontally adjustable in one direction and supporting said die holder, said support members providing die holder securing means along lines perpendicular to said adjustable direction.

3. A die assembler having a lower vertically movable carriage means adapted for mounting a lower die holder thereon within a working area above such carriage means, frame means including vertical guide means supporting said carriage for vertical movement, actuator means secured to said frame means and said carriage means to selectively raise or lower said carriage means, trunnion means provided by said frame means, shaft means on said trunnion means rotatable about a horizontal axis, stop means limiting rotation of said shaft means to 180° between two stop positions, support bracket means secured to said shaft means and adapted for mounting an upper die holder thereon, said bracket means supporting said upper die holder in vertical alignment above said lower die holder when said shaft means is arrested in one of said stop positions, said shaft means being horizontally offset from said working area such that said bracket means may support said upper die holder in an inverted position horizontally displaced from said working area when said shaft means is arrested in the other of its positions, said support bracket means being horizontally adjustable along said shaft means and said bracket means providing die holder securing means along lines perpendicular to said shaft means.

4. A die assembler having a lower vertically movable carriage means adapted for mounting a lower die holder thereon within a vertically extending working area above such carriage means, frame means including vertical guide means supporting said carriage for vertical movement, actuator means secured to said frame means and said carriage means to selectively raise or lower said carriage means, trunnion means provided by said frame means, shaft means on said trunnion means rotatable about a horizontal axis, stop means limiting rotation of said shaft means between first and second positions, support bracket means secured to said shaft means and adapted for mounting an upper die holder thereon, said bracket means being adapted to support said upper die holder in vertical alignment above a lower die holder in said working area when said shaft means is arrested in said first position, said shaft means being horizontally offset from said working area such that said bracket means supports said upper die holder in a position horizontally displaced and substantially out of said working area when said shaft means is rotated from said first position to said second position, said bracket means being horizontally adjustable along said shaft means to permit said upper die holder to be secured thereto at its edges, and said carriage means including support means adapted to support said lower die holder at its edges while leaving a substantial area immediately below its center unobstructed.

5. A die assembler as set forth in claim 3 wherein said shaft includes a longitudinal plane surface and said bracket means includes surfaces complementing said plane surface when said bracket means are secured to said shaft means.

6. A die assembler as set forth in claim 2 wherein said actuator means comprises a fluid-actuator piston and cylinder means.

References Cited
UNITED STATES PATENTS

| | | | |
|---|---|---|---|
| 3,015,832 | 3/1960 | Zagar | 83—564 X |
| 3,379,139 | 9/1965 | Lipinsky | 83—564 X |
| 3,460,226 | 4/1967 | Hilderbrand | 29—200 |

WILLIAM S. LAWSON, Primary Examiner

J. F. COAN, Assistant Examiner

U.S. Cl. X.R.

29—200 J, 200 P; 83—564